United States Patent
Mogre et al.

(10) Patent No.: US 11,822,546 B2
(45) Date of Patent: Nov. 21, 2023

(54) METHOD, APPARATUS AND COMPUTER PROGRAM FOR AUTOMATICALLY PROCESSING DATA IDENTIFIERS

(71) Applicant: SIEMENS AKTIENGESELLSCHAFT, Munich (DE)

(72) Inventors: Parag Mogre, Munich (DE); Philipp Pott, Neunkirchen am Brand (DE)

(73) Assignee: Siemens Aktiengesellschaft, Munich (DE)

( * ) Notice: Subject to any disclaimer, the term of this patent is extended or adjusted under 35 U.S.C. 154(b) by 273 days.

(21) Appl. No.: 17/286,100

(22) PCT Filed: Oct. 15, 2019

(86) PCT No.: PCT/EP2019/077838
§ 371 (c)(1),
(2) Date: Apr. 16, 2021

(87) PCT Pub. No.: WO2020/078940
PCT Pub. Date: Apr. 23, 2020

(65) Prior Publication Data
US 2021/0382882 A1   Dec. 9, 2021

(30) Foreign Application Priority Data
Oct. 18, 2018   (EP) .................................... 18201269

(51) Int. Cl.
*G06F 16/245*   (2019.01)
*G06F 16/242*   (2019.01)
*H04L 67/10*   (2022.01)

(52) U.S. Cl.
CPC .......... *G06F 16/245* (2019.01); *G06F 16/242* (2019.01); *H04L 67/10* (2013.01)

(58) Field of Classification Search
CPC ............................. G06F 16/245; G06F 16/242
See application file for complete search history.

(56) References Cited

U.S. PATENT DOCUMENTS

| | | |
|---|---|---|
| 2011/0055121 A1 | 3/2011 | Datta et al. |
| 2012/0038462 A1 | 2/2012 | Adler et al. |

(Continued)

FOREIGN PATENT DOCUMENTS

| | | | |
|---|---|---|---|
| CN | 107038157 A | * 8/2017 | ............. G06F 15/76 |
| EP | 2660667 A2 | 11/2013 | |
| WO | WO-2018208715 A1 | * 11/2018 | ........... G06F 21/552 |

*Primary Examiner* — James E Richardson
(74) *Attorney, Agent, or Firm* — Lempia Summerfield Katz LLC

(57) ABSTRACT

The invention is a method, an apparatus and a computer program for the automatic processing of data identifiers (20, 22), wherein data (12) associated with data identifiers (20, 22) is transmitted to a cloud platform (16) and to an analysis unit (32) there having at least one functional unit (45-50), wherein each functional unit (45-50) performs an analysis of the data (12) and/or associated data identifier (20, 22) and outputs a confidence value as an analysis result, wherein the or each confidence value is mapped to an overall confidence value (60), wherein the overall confidence value encodes a correlation between two data identifiers (20, 22), wherein data identifiers (20, 22) determined as correlated are combined under a higher-order variable name (66), and wherein the higher-order variable name (66) can be used for a database query, which supplies data relating to all data identifiers (20, 22) combined under the variable name (66), wherein data identifiers (20, 22) having an overall confidence value (60) above a predefined or predefinable threshold value are correlated.

18 Claims, 4 Drawing Sheets

(56) References Cited

U.S. PATENT DOCUMENTS

| | | | |
|---|---|---|---|
| 2012/0158695 A1* | 6/2012 | Stuart | G06F 16/2453 |
| | | | 707/E17.017 |
| 2017/0337202 A1* | 11/2017 | Arya | H04L 67/535 |
| 2018/0060387 A1* | 3/2018 | Le | G06F 16/24534 |
| 2018/0231391 A1* | 8/2018 | Yang | G06N 20/00 |

\* cited by examiner

METHOD, APPARATUS AND COMPUTER PROGRAM FOR AUTOMATICALLY PROCESSING DATA IDENTIFIERS

CROSS REFERENCE TO RELATED APPLICATIONS

This present patent document is a § 371 nationalization of PCT Application Serial Number PCT/EP2019/077838 filed on Oct. 15, 2019, designating the United States, which is hereby incorporated in its entirety by reference. This patent document also claims the benefit of EP 18201269.0 filed on Oct. 18, 2018 both are which are also hereby incorporated in their entirety by reference.

FIELD

Embodiments relate to a method for automatically processing data identifiers, for example variable names, names of data types instantiated when creating a variable and names of assembled data types.

BACKGROUND

Modern automation techniques and the opportunities for data capture that are provided within the framework of the Internet of Things (IoT) result in considerable volumes of data. The evaluation of the data may be worthwhile and desirable for a wide variety of reasons. By way of example, in the case of data transmitted to a cloud platform—also referred to as IoT platform below—it is possible for different but similar installations to be contrasted in order for example to compare the capacity of the installations or to predict failures of the installations. The opportunities for evaluating such data, especially the opportunities for automatic evaluation, are sometimes limited, however.

An example that may be used for similar installations is wind power installations or wind power installations combined into wind farms. Each wind power installation may transmit capacity data to a cloud platform. If the data are transmitted by respective identical data identifiers—for example "Performance"—then the cloud platform may automatically assign the capacity data to one another and for example present the capacity data of the individual wind power installations in a manner plotted over a time axis. This allows a fast comparison of the capacity of the individual wind power installations.

Problems arise, however, if different data identifiers are used for identical or similar data, that is to say for example for the aforementioned capacity data. Automatic assignment is then not possible and instead an intervention of a human expert is necessary. Simple examples of data identifiers conceivable in the scenario mentioned are identifiers such as "Capacity" and "Performance". Data described thereby are not readily detectable as identical or similar—referred to concisely as "interrelated" below—automatically. The required intervention of a human expert is involved and susceptible to error, however. This situation that when data are transmitted to a cloud platform it is usually not just a single data type, such as for example capacity data, that is transmitted, but rather a multiplicity of different data, as are directly or indirectly capturable by a sensor system that a respective installation includes. When manual assignment is required, the sheer volume of transmitted data leads to the aforementioned considerable involvement, especially in terms of time. Against the background of the time required, a not inconsiderable susceptibility to error may also be expected in the case of evaluation by a human expert.

The outlined involvement and the susceptibility to error lead to no assignment at all being made, and the lack of assignment leaves fundamentally provided opportunities for evaluating data transmitted to a cloud platform unused and is an obstacle for example to detecting opportunities for optimization, errors or developing error situations and the like.

US 2011/0055121 A1 discloses a method for identifying an observed phenomenon, the method including the following method steps: receiving different data streams that have different assigned data sources; generating a set of attributes for each data stream; soft-assigning tags to attributes for each set of attributes, that generates a confidence value for each soft assignment; standardizing the confidence values; and generating an output that indicates the phenomenon, based on the standardized confidence values.

SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a method for automatically processing data identifiers that allows detection of interrelated data identifiers and/or of interrelated data associated with in each case at least one data identifier.

Data associated with a data identifier are understood to refer to data described directly by a variable name (data identifier), but also data described indirectly along these lines. An indirect description exists for example if a characteristic data type is used for the respective variable and for example the name of the data type may be evaluated in order to detect a possible interrelation. Such an indirect description also exists for example along a hierarchy of assembled data types. As an example, in this context, the data types "Asset" and "Aspect" may be used for transmitting data to a cloud platform and of identifiers and IoT device information used within the framework of a data model of an IoT platform—referred to as IoT model below.

Embodiments provide a method for automatically processing data identifiers. The method includes data provided with data identifiers or data associated with data identifiers along the lines outlined above are transmitted to a cloud platform. Within the realm of the cloud platform, at least temporary processing of the data and/or of the data identifiers is affected by an analysis unit. The function of the analysis unit may be implemented in software. The analysis unit includes at least one functional unit. The or each functional unit performs an analysis of the data and/or associated data identifiers transmitted to the cloud platform. On the basis of a result of the analysis, the respective functional unit ascertains a confidence value. The or each functional unit thus receives the data and/or associated data identifiers as input values, and the confidence value ascertained as the result of the analysis is an output value of the respective functional unit. The or each confidence value is mapped to an overall confidence value. If there is just one functional unit and accordingly just one resultant confidence value, then this is the overall confidence value. If there are multiple functional units, the overall confidence value is obtained by virtue of a combination of the confidence values of the individual functional units, for example a numerical or logical combination, for example by forming the mean value of the confidence values of the individual functional units (numerical combination). The overall confidence value codes an interrelation between two data identifiers, for example with a numerical value in a value range from "0.0" to "1.0", where "1.0" codes an automatically established absolute interrelation. Data identifiers ascertained as being interrelated or as being sufficiently interrelated are combined under a higher-order variable name, or a data identifier is added to an already existing combination. The higher-order variable name is able to be used as a keyword for a database query that ultimately delivers data pertaining to all the data identifiers combined under the higher-order variable name. Data identifiers including an overall confidence value above a predefined or predefinable threshold value are interrelated.

Transferred to the example with capacity data chosen at the outset, that are associated with data identifiers such as "Capacity" and "Performance", for example, this means that at least one functional unit is used to ascertain the interrelation between the capacity data and/or the data identifiers, that this interrelation is expressed by at least one confidence value and a resultant overall confidence value, that the data identifiers are combined under a higher-order variable name, for example "Capacity" or "Installation capacity", and that data pertaining to all the data identifiers combined under the higher-order variable name are available in the event of a database query using this higher-order variable name. A database query using for example "Installation capacity" accordingly thus delivers the data associated with the data identifier "Capacity" and also the data associated with the data identifier "Performance". If different, but similar or at least substantially similar, installations deliver (transmit to the cloud platform) their capacity data with such data identifiers, the approach is used to automatically detect the interrelation between such identifiers, and the automatically detected interrelation may be used for a database query, for example. This may in turn be used for automatically creating a combined overview of the installation capacities of the respective installations.

The described interrelation may be detected automatically or at least partially automatically. If fully automatic detection is not possible, for example because an overall confidence value that is not sufficient for reliable automatic detection is obtained as result, the data and/or associated data identifiers under consideration may be contrasted in a way that is easy for a human expert to grasp, for example as an output on a screen. The expert may then make the final decision regarding the interrelation and either confirm or deny the interrelation. Even in the case of such an interrelation confirmed only by an intervention of a human expert, the respective data identifiers are combined under a higher-order variable name, or a data identifier is added to an already existing combination.

The combination under a higher-order variable name allows concise access to the data detected as interrelated. This allows for example automatic generation of graphics that show the data, detected as interrelated, of different but similar installations, for example physically remote installations, in a joint view and over a joint time axis.

Data identifiers including an overall confidence value above a predefined or predefinable threshold value, for example "0.9" in the case of a value range from "0.0" to "1.0", may be interrelated, e.g., to be automatically identified as interrelated. Accordingly, data identifiers including an overall confidence value below a predefined or predefinable limit value, for example "0.5" in the case of a value range from "0.0" to "1.0", may be automatically rejected as not interrelated. In the case of data identifiers including an overall confidence value between the limit and threshold values, a user query to possibly confirm the interrelation is optionally automatically triggered.

Embodiments provide an apparatus for performing the method. The apparatus is a computer available in the cloud or a computer system including a cloud platform and an analysis unit loaded there as described here and below.

The analysis unit and the or each functional unit that it includes is realized for automatic execution in the form of a computer program, for example a distributed computer program. Embodiments also provide a computer program including program code instructions executable by a computer and a storage medium including a computer program, e.g., a computer program product including program code, and a computer available in the cloud or a computer system with memory where a computer program is loaded or loadable for performing the method and the configurations thereof.

When method steps or method step sequences are described below, this relates to actions that are performed on the basis of the computer program or under the control of the computer program, unless it is expressly pointed out that individual actions are prompted by a user of the computer program. At a minimum, any use of the term "automatic" means that the relevant action is performed on the basis of the computer program or under the control of the computer program.

Instead of a computer program including individual program code instructions, the method described here and below may also be implemented in the form of firmware. Instead of a method being implemented in software, an implementation in firmware or in firmware and software or in firmware and hardware may be used. The term software or the term computer program also covers other implementation options, for example an implementation in firmware or in firmware and software or in firmware and hardware.

Features and details that are described in connection with the method for automatically processing data identifiers and any configurations naturally also apply in connection with and in respect of the apparatus configured for performing the method, and vice versa. Accordingly, the method may also be developed by individual or multiple method features that relate to method steps performed by the apparatus, and the apparatus may accordingly also be developed by, for example, software functional units (program code), for performing method steps performed within the framework of the method. Consequently, features and details that are described in connection with the method for automatically processing data identifiers and any configurations naturally also apply in connection with and in respect of the apparatus intended for performing the method, and in each case vice versa.

In an embodiment, various functions may be provided, for example, analysis functions, of the or each functional unit of the analysis unit. In the case of an analysis unit including precisely one functional unit, this may act either as linguistic analysis functional unit, as statistical analysis functional unit, as spectral analysis functional unit, as correlation analysis functional unit, as cluster analysis functional unit or as context analysis functional unit. The analysis unit may then be realized using precisely one functional unit, that is configured to be able to automatically detect any interrelation of the type outlined above.

In an embodiment, the analysis unit may include at least two different functional units. In the case of an analysis unit including more than one functional unit, each functional unit may perform a different analysis function, and the analysis unit then includes different functional units from the group including the following functional units: linguistic analysis functional unit, statistical analysis functional unit, spectral analysis functional unit, correlation analysis functional unit, cluster analysis functional unit and context analysis functional unit. Detection of an interrelation by two or more different functional units is an even stronger indication of an actual interrelation. The analysis result may be improved by using additional functional units.

An overall confidence value that is improved on the basis of the combination of multiple confidence values into an overall confidence value (improved in comparison with an overall confidence value based only on one confidence value) is optionally marked (annotated) accordingly. The annotation may be used to automatically detect whether the overall confidence value is based on precisely one confidence value from precisely one functional unit or on multiple confidence values from at least two functional units. A possible annotation is for example an additional datum assigned to the overall confidence value. This additional datum may be a binary datum and then codes whether the overall confidence value is based on precisely one confidence value or at least two confidence values. The additional datum may also be a datum that codes the number of confidence values on which the overall confidence value is based numerically or in some other enumerative manner, for example "3", "***" or the like for precisely three underlying confidence values.

In an embodiment of a method for automatically processing data identifiers that is based on the use of at least two different functional units, at least one of the at least two functional units is activable or deactivable. Such activability or deactivability means that the relevant functional unit is connectable. Activability or deactivability of individual functional units means that the analysis functionality of the analysis unit may be geared specifically to the data and/or data identifiers that are to be processed. The quality of the analysis result may be improved thereby.

In an embodiment of a method for automatically processing data identifiers that is based on the use of at least two different functional units, at least one of which is activable or deactivable, the activation or deactivation of a functional unit or of individual functional units is affected in accordance with a predefined or predefinable activation scheme. The activation scheme may be useful when the analysis unit is implemented with more than two individually activable or deactivable functional units. The use of such an activation scheme means that not every single functional unit needs to be selected for activation or deactivation. Instead, the application of an activation scheme leads to automatic activation of individual functional units coded therein and also to automatic deactivation of the functional units that are not needed. The activation schemes may be created and reserved for different applications. Depending on the application, an activation scheme is selected. The selection is made regularly by a human expert, an automatic selection also being conceivable, for example a selection oriented to a data identifier that is analyzed first and/or to data associated therewith.

When there is a plurality of individually activable or deactivable functional units, an embodiment of the method for the activation scheme may provide for coding of an order of activation and/or a time of activation for the or each functional unit that is to be activated. This permits specific control of the resource requirement (in particular processing power and/or storage capacity) of the analysis unit and the functional units that they include. For example, there may be provision for initially, for example during online processing, only precisely one functional unit to be active or only a few functional units to be active, in order to obtain a first result in reference to a possible interrelation. Later, for example during offline processing, further or other functional units may be activated, in order to confirm or else reject the result as required.

When there is a plurality of functional units, for example a plurality of individually activable or deactivable functional units, an embodiment of the method for the confidence value of each functional unit or of each activated functional unit may providing mapping to the overall confidence value in accordance with a predefined or predefinable mapping scheme. This affords the advantage that the overall confidence value may be formed specifically in regard to the respective functional units or activated functional units. Different functional units or different activated functional units, for example a different relevance of the confidence values available therefrom in each case, may thus be taken into consideration by appropriate mapping schemes, for example mapping schemes including different weight factors for the individual confidence values.

DETAILED DESCRIPTION

Figure 1:
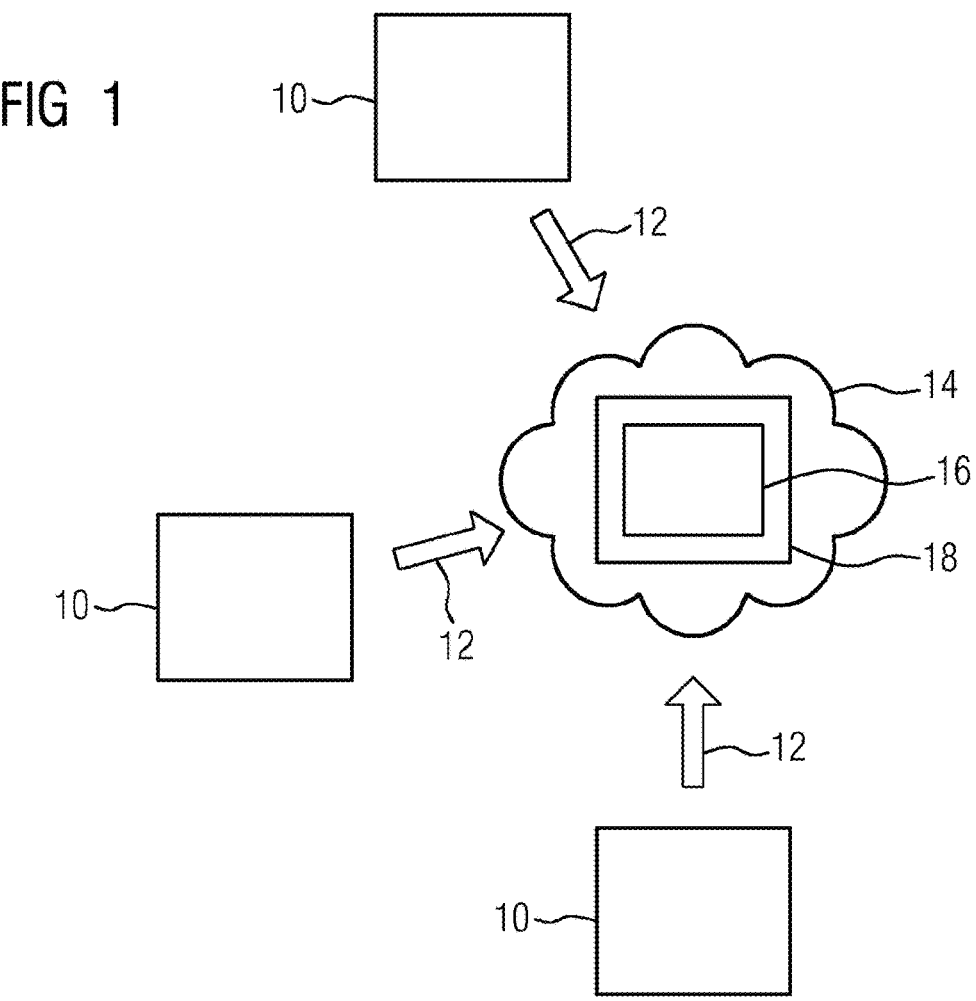
FIG. 1 depicts multiple installations that transmit data to a cloud platform according to an embodiment.

The depiction in FIG. 1 depicts—in a highly simplified schematic form—various automated or at least semiautomated technical installations 10 or facilities (referred to concisely as installations 10 below without sacrificing further general validity). The depicted installations 10 are identical or at least substantially identical installations 10. Examples of installations 10 of the depicted type are press lines, component fitting installations, (gas) turbine installations, wind farms or wind power installations, and so on. The individual installations 10 are situated at different geographical locations, for example. Possible installations 10 of the aforementioned type are also "mobile" installations 10, for example railway trains or power units of such railway trains.

It is expressly pointed out that the cited examples are not conclusive. The approach proposed here is possible for any automated or at least semiautomated technical installations 10 in principle.

For the remainder of the description, it is assumed—without sacrificing further general validity—that each of the installations 10 shown in FIG. 1 is a wind farm including in each case at least one wind power installation.

For the purpose of centrally monitoring multiple installations 10 of the aforementioned type or else for the purpose of centrally capturing data from installations 10 of the aforementioned type, it is customary today for any such installation 10 to transmit data, in particular sensor data 12, to a cloud platform 16 available in the so-called cloud 14, that is to say a possibly distributed computer system 18 available in the cloud 14, in a manner that is fundamentally known per se.

The sensor data 12 are obtained on the basis of measured values or the like from a sensor system that is fundamentally known per se, not shown and used for the automation of a respective installation 10. The sensor data 12 may also be derived from such measured values and may be obtained for example in the form of calculation results or processing processes for the automation of a respective installation 10. The sensor data 12 include for example status information, quantity information, statistical information, signal characteristics and the like. Status information relates for example to a status of the respective installation 10 or of an installation part or to a status of the automation hardware provided for automating the respective installation 10 or of part of the automation hardware. Quantity information may relate for example to consumption quantities or quantities produced. Quantity information for a component fitting installation may relate to installed component quantities or else units produced. Statistical information may include for example quantity information of the aforementioned type or may relate such quantity information to specific time periods. Other examples of statistical information are information in reference to an operating time of an installation or an installation part or in reference to (fault-related, maintenance-related, etc.) down times.

Such or similar sensor data 12 arrive on the cloud platform 16 and are captured centrally there. Immense volumes of data arise simply on the basis of sensor data 12, that often arise in continuous or quasi-continuous form, in particular sensor data 12 in the form of so-called time series. When there is a plurality of installations 10 monitored by the same cloud platform 16, a volume of data increased in accordance with the number of installations is obtained.

The sensor data 12 are transmitted to the cloud platform 16 by an interface between the respective control software of an installation 10 and the cloud platform 16. Such an interface function is known. One cloud platform 16 used is known by the name "MindSphere" and includes the interface function for the control software.

The description below is continued using the example of MindSphere and the terminology introduced there. Other IoT platforms and a different terminology may be used. The term MindSphere is used instead of the term cloud platform 16 and synonymously with the term cloud platform 16. Accordingly, the reference numeral previously introduced for the term cloud platform 16 is also used for the term MindSphere. Whenever the term MindSphere 16 is mentioned, the more general term cloud platform 16 is always included. In the broadest sense, MindSphere 16 is a database and the sensor data 12 or the like are adopted therein. The queries that become possible by the approach proposed here also relate to the database.

The data capture and data provision with MindSphere 16 involves assets and aspects. An asset may be or describe any element of an installation 10 or a whole installation 10, for example a pump, a motor, a PLC, a whole machine tool, a production line, a robot, a crane, a vehicle, a wind power installation, etc., to cite just a few examples. Such a (physical) asset may include a virtual asset in MindSphere 16. A physical asset includes data points, for example by virtue of a pump being assigned multiple sensors that each deliver sensor data 12. For the purpose of monitoring an installation 10 by MindSphere 16, the data points of at least individual physical assets are defined as data sources and the data sources of a physical asset are assigned to an asset (virtual asset) in MindSphere 16.

Sensor data 12 and the like in the form of present values of a wide variety of variables, that are created in a manner fundamentally known in control software intended for automating the installation 10, are available at the level of the respective installation 10. These are the data points accessed by MindSphere 16.

Within MindSphere 16, an asset is a digital representation of an installation 10 or of part of an installation 10, for example a machine within the installation 10, or of an automation system including one or more automation devices (e.g., PLCs) connected to MindSphere 16.

So-called aspects are a data modelling mechanism for assets. Aspects group data points based on the logical, spatial and/or functional assignment thereof. For example: a pump unit (asset) includes a power consumption (aspect), that includes the data points "power", "current", "voltage", etc. The aspect is defined by a computer program described in the technical terminology as an asset manager, and its name may be chosen freely but should have a connection to data points and/or the respective asset. An aspect may include of multiple variables, and each variable is connected to a data source by the asset manager ("data mapping").

Figure 2:
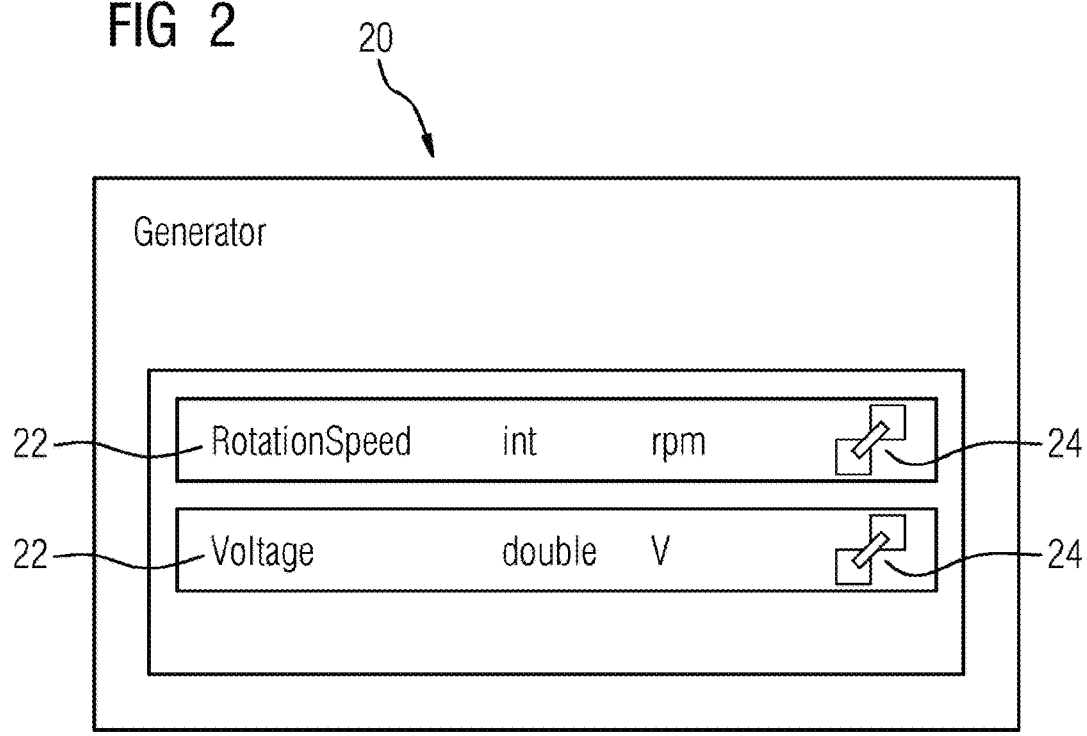
FIG. 2 depicts a data structure used for transmitting data to the cloud platform with a data identifier in the form of a variable name according to an embodiment.

The depiction in FIG. 2 depicts an aspect 20 of a wind power installation by way of illustration. A wind power installation includes a generator. An aspect 20 is created therefor in MindSphere 16. The aspect combines properties of the generator in the form of individual variables 22, for example the rotation speed ("RotationSpeed") and the generated voltage ("Voltage"). Each variable 22 includes a data type (here "int" or "double"). Each variable 22 may include an assigned unit (here "rpm" for a speed of rotation, or "V" for a voltage). Each variable 22 is linked to a data point. The link is shown only symbolically by a link symbol 24. A specific formulation of a link ("Mapping") may read as follows, for example: "InstallationXY.UnitXY.Data_PointXY.Speed_of_Rotation". In this case, "InstallationXY", etc., are each identifiers that are an example of an identifier specifically used in an automation project. In the case of a wind turbine or wind power installation, the link may read as follows, for example: Wind_Turbine1.Generator1.Performance.Speed_of_Rotation.

A data model with assets and aspects 20 is taken as a basis for effecting a data capture for the respective installation 10 and a transmission of the data 12, for example the data 12 coming from individual data sources and data points, to MindSphere 16. The transmitted data 12 are then made available within MindSphere 16 or by MindSphere 16 for further processing and evaluation.

The data 12 are associated with at least one data identifier 20, 22. In the example depicted, the name of the variables 22 and the name of the aspect 20 act as data identifiers 20, 22. In general, names coming from a respective IoT data model (variable names, type names, aspect names, asset names) or IoT device information act as data identifiers 20, 22.

Figure 3:
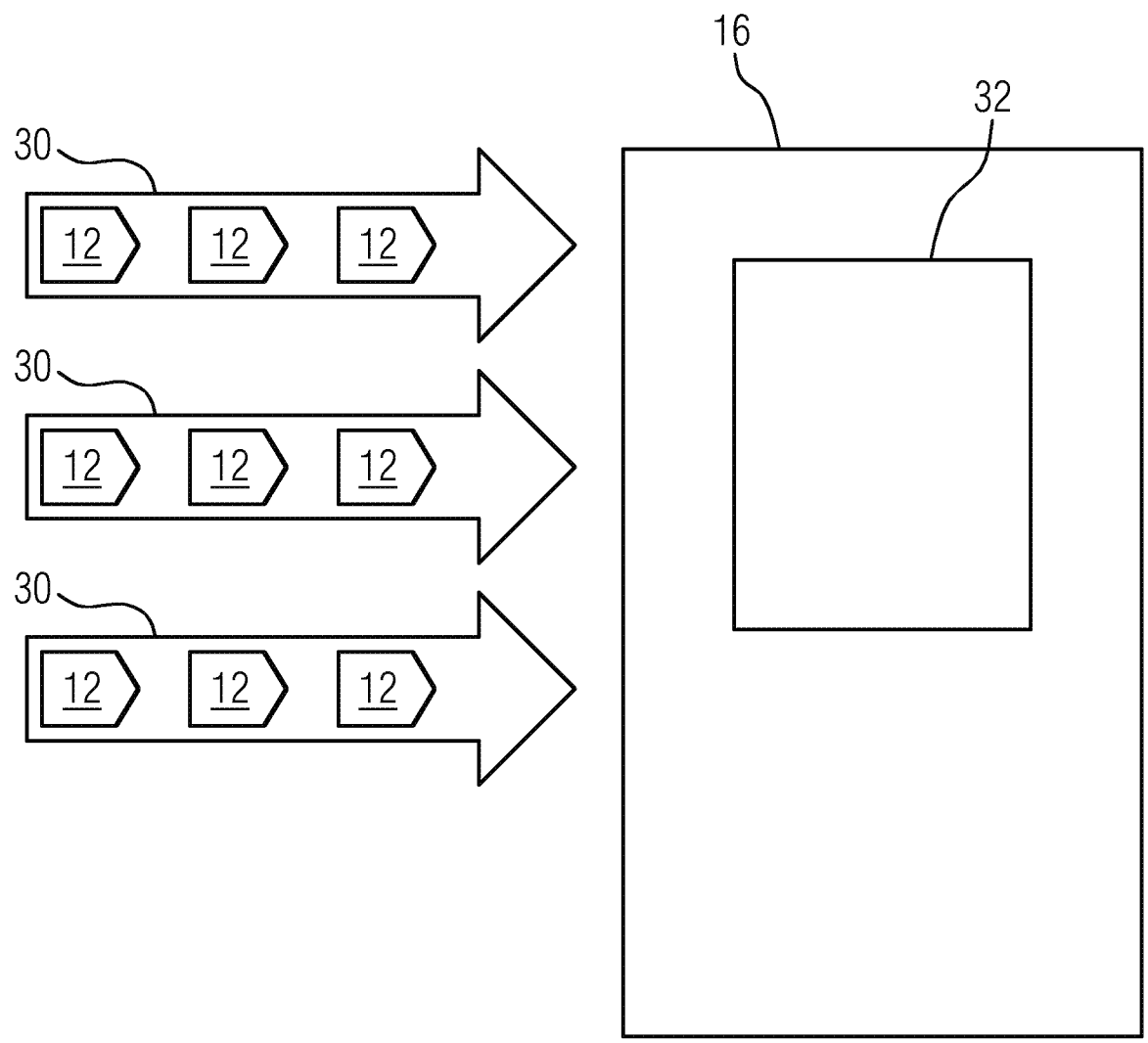
FIG. 3 depicts an analysis unit that the cloud platform includes and that is intended for processing and analyzing the incoming data according to an embodiment.

MindSphere 16 receives the data 12 in the form of an, for example unformatted, data stream 30 (FIG. 3), for example in the form of so-called key value pairs, e.g., in the form of pairs of data 12 that are each provided with a data identifier 20, 22. More than one data stream 30 may come from each installation 10, for example one data stream 30 from each data source or one data stream 30 from each data point. At a minimum, at least one data stream 30 comes from each installation 10. In the depiction in FIG. 3, three data streams 30 are shown by way of illustration. Each data stream 30 comes from one of the installations 10 shown in FIG. 1, for example. Each data stream 30 includes for example speed-of-rotation data as data 12. The type of data 12 that a data stream 30 includes is not immediately detectable automatically. For that reason, each data stream 30 or the data 12 that they include is associated with at least one data identifier 20, 22. If a data identifier 20, 22 is sufficiently unique then for example the speed-of-rotation data of the installations 10 may be combined in a suitable manner, so that a concise overview may be created.

However, precisely such uniqueness of the data identifiers 20, 22 is often lacking. Data identifiers 20, 22 are frequently used in a particular national language. In addition to the example used at the outset, this may also be shown using the example of speed-of-rotation data. Possible identifiers for such speed-of-rotation data are different words or expressions in different languages (German: "Drehzahl"; English: "revolution speed", "rotational frequency" or "speed"; French: "nombre de tours", "frequence de rotation" or "vitesse") and/or abbreviations are used ("rev", "rot", etc.).

This results from the fact that in particular large industrial projects including physically distributed installations 10, for example installations 10 situated in different countries, are created in a customer-specific and/or country-specific configuration and thus produce data 12 including different descriptions (naming) and transmit the data to MindSphere 16 (to the cloud platform 16). This leads to the problem that such data 12 may be converted or transferred to standard variables only with a high level of manual effort in higher-order evaluations.

Embodiments provide for an analysis unit 32 in Mindsphere 16 that analyzes each data stream 30 at least temporarily. The analysis unit 32 is implemented in software and shown with further details in the depiction in FIG. 4.

The analysis unit 32 includes at least one functional unit 40-50 by which an analysis of an incoming data stream 30 or of multiple incoming data streams 30 is affected. In the embodiment depicted, the analysis unit 32 includes a plurality of individual, independent functional units 40-50 by which a respective specific analysis of incoming data streams 30 and the data 12 that they include is affected. Each functional unit 40-50 performs a comparison, in the broadest sense, of the data identifiers 20, 22 and/or of the data 12 associated therewith from at least two data streams 30, and a magnitude referred to as confidence value below appears as analysis result at the output of each functional unit 40-50. The confidence value codes the probability with which it may be assumed that the analyzed data streams 30 and the data 12 that they include are thematically interrelated. This is the case for example if the data 12 each represent speeds of rotation of identical or comparable units, for example a generator of a wind power installation, or temperatures of identical or comparable units, that is to say for example temperatures of a reaction vessel, and so on.

The coding of the confidence value is arbitrary in principle. Possibilities are a coding as a percentage, that is to say for example values from "0%" to "100%", a coding with values from "0.0" to "1.0" or else a coding in alphanumeric form in accordance with an ordinal scale. In the interest of better readability—but without sacrificing further general validity—the description below is continued on the basis of a confidence value expressed using values from "0.0" to "1.0". A confidence value of "1.0" in this case means that it may be assumed that the analyzed data streams 30 and the data 12 that they include are thematically interrelated in the manner outlined above. A confidence value of "0.0" accordingly means that no such thematic relationship was able to be established between the analyzed data streams 30 and the data 12 that they include.

The functional units 40-50 may be individually activable and deactivable. Only an activated functional unit participates in the analysis. An embodiment of the analysis unit 32 provides for individual functional units 40-50 to be activable in a predefined or predefinable order (sequential order) and activated in the respective order during operation of the analysis unit 32. The individual functional units 40-50 are explained below.

A first functional unit 40 performs a linguistic analysis with regard to data identifiers 20, 22 that the data streams 30 include or to data identifiers 20, 22 assigned to the data 12 or the data streams 30 in another way (for example according to the IoT data model or on the basis of IoT device information). The first functional unit 40 may therefore also be referred to as linguistic analysis functional unit 40. This functional unit 40 is used to automatically (for example using at least one electronic dictionary) detect for example that identifiers such as "Drehzahl", "revolution speed", "rotational frequency", "speed", "nombre de tours", "fréquence de rotation", "vitesse", "rev", "rot", etc., describe one and the same thing, namely a speed of rotation. It is thus automatically detected that the data 12 that the data streams 30 include are speed-of-rotation data, and the interrelationship between the data streams 30 and the data 12 that they include may be stored.

In a specific case, for example one of the data streams 30 is associated with the data identifier 20, 22 "speed of rotation" and another data stream 30 is associated with the data identifier 20, 22 "frequence de rotation". The first functional unit 40 is used to automatically detect the linguistic equality of the two data identifiers 20, 22. The confidence value that is output is then the value "1.0". This results from the fact that, in the example assumed, both data identifiers 20, 22 in the spelling associated with the data streams 30 are included for example in an electronic dictionary that the functional unit 40 accesses. If the spelling is different, for example "frequence de rotation" instead of "frequence de rotation", then absolute equality no longer exists. This is automatically taken into consideration in the confidence value. For example, a confidence value of "0.95" is then output. In this way, data identifiers 20, 22, associated with data streams 30, that for example are not included in an electronic dictionary, such as for example "frequence de rotation" or "freq de rotation", etc., are also evaluable.

A second functional unit 42 performs a statistical analysis of the data 12 that the data streams 30 include, and may therefore also be referred to as statistical analysis functional unit 42. This functional unit 42 considers the data 12 that the data streams 30 include and ascertains for example minimum values, maximum values, mean values, standard deviations and/or frequency distributions, etc. The or each statistical magnitude ascertained for a respective data stream 30 may be automatically compared by this functional unit 42 with corresponding statistical magnitudes ascertained for another data stream 30. On the basis of the concordance of the statistical magnitudes, a confidence value is obtained at the output of this functional unit 42. If, for example in the case of two data streams 30, the data 12 that the data streams include have identical minimum values and identical maximum values, the confidence value that is output is "1.0". If the statistical magnitudes are not exactly concordant, this is accordingly taken into consideration in the confidence value. The more the ascertained statistical magnitudes differ from one another, the lower the confidence value.

A third functional unit 44 performs a spectral analysis of the data 12 that the data streams 30 include, and may therefore also be referred to as spectral analysis functional unit 44. This functional unit 44 also considers the data 12 that the data streams 30 include and ascertains, in each case for example by an FFT (Fast Fourier Transformation), the spectral components of the data 12 that the data streams 30 include. These are compared with one another in a subsequent step, and on the basis of the degree of concordance a confidence value is obtained, for example a confidence value that is higher the greater the degree of concordance.

A fourth functional unit 46 performs a correlation analysis of the data 12 that the data streams 30 include, and may therefore also be referred to as correlation analysis functional unit 46. This functional unit 46 also considers the data 12 that the data streams 30 include and ascertains, for example by a cross correlation function (CCF), the correlation for the order of the data 12 that the data streams 30 include. The confidence value is obtained on the basis of the result of the cross-correlation function.

A fifth functional unit 48 performs a cluster analysis of the data 12 that the data streams 30 include, and may therefore also be referred to as cluster analysis functional unit 48. The functional unit 48 also considers the data 12 that the data streams 30 include. At least one cluster results on the basis of each data stream 30 and the data 12 thereof. The functional unit 48 ascertains the clusters and compares them, for example with regard to their location, form and/or extent. An automatic comparison of the ascertained clusters is possible on the basis of numerical values that describe such characteristic parameters of the ascertained clusters. The confidence value is obtained on the basis of the degree of concordance of the ascertained clusters with regard to such or similar characteristic parameters.

A sixth functional unit 50 performs a context analysis, and may therefore also be referred to as context analysis functional unit 50. The functional unit 50 includes at least one further functional unit 52-58. In the embodiment shown, the context analysis functional unit 50 includes multiple individually activable and deactivable further functional units 52-58. The or each further functional unit 52-58 outputs a confidence value—as described above. The confidence values of activated further functional units 52-58 are combined to form a confidence value of the context analysis functional unit 50.

A first further functional unit 52 performs a context analysis with regard to a relation between the asset or aspect types involved in the data transmission in MindSphere 16. If there is a concordance between the types (data types) then there is a high level of correlation and an applicable confidence value is obtained as result.

A second further functional unit 54 performs a context analysis with regard to at least one of the following factors: a type (device type) of that device to which the data point from which the data 12 come is assigned; the protocol used to transmit the data 12 (data protocol); a location of the device with sensors assigned to the data point and/or the device. A degree of concordance may be ascertained with regard to each factor considered. If for example the result is that two data streams 30 each come from devices of the same type, a high degree of concordance and a corresponding confidence value are obtained. If more than one factor is checked (for example device type and data protocol) and a high degree of concordance is ascertained for both factors, a higher confidence value is obtained. The actual confidence value is dependent on how many factors are checked or may be checked at the same time and what degree of concordance was ascertained with regard to the or each checked factor.

A third further functional unit 56 performs a context analysis with regard to a sampling rate at which the data 12 arrive in the respective data stream 30. If the sampling rate is identical or substantially identical, a high confidence value is obtained. The more the ascertained sampling rates differ from one another, the lower the confidence value output by this further functional unit 56. The sampling rate is obtained for example by virtue of the data 12 that a data stream 30 includes being provided with a time stamp, as a result of which the sampling rate is ascertainable on the basis of a difference between two such pieces of time information. Another option for ascertaining the sampling rate is for example for the definition of the asset or aspect types—or the IoT data model—involved in the data transmission in MindSphere 16 to include a specification for the sampling rate, as a result of which the applicable value may be read there by this further functional unit 56.

A fourth further functional unit 58 performs a context analysis with regard to a data type of the variables 22 (FIG. 2) and/or to an identifier of the variables 22 of the assets and aspects 20 involved in the data transmission in MindSphere 16. A high degree of concordance with regard to the or each factor checked by this further functional unit 58 leads to a correspondingly high confidence value.

The analysis of the data 12 of a first data stream 30 and of the data 12 of at least one further data stream 30 and/or of at least one respective data identifier 20, 22 may be affected at the same time or at successive times. If the analysis is not at the same time, then for example a data identifier 20, 22 is stored and for example compared with a data identifier 20, 22 of another data stream 30 and/or of the data 12 that the other data stream includes, which data identifier is ascertained later, by the linguistic analysis functional unit 40. The same applies accordingly if for example statistical characteristic values for the data 12 that a data stream 30 includes are ascertained that, prior to a comparison (for example by the statistical analysis functional unit 42), are buffer-stored with statistical characteristic values of another data stream 30 that are ascertained later.

Depending on which functional units 40-50 and possibly which further functional units 52-58 are activated, for example in accordance with an activation scheme 62 (FIG. 4), a corresponding multiplicity of confidence values is automatically obtained. These are mapped to precisely one confidence value (overall confidence value 60), for example by forming a mean value or by forming a mean value weighted with individual weight factors.

A mapping scheme 64 (FIG. 4) on which the formation of the overall confidence value 60 is based may be dependent on the type and number of activated functional units 40-50, 52-58. A default mapping scheme may provide, for example, for each functional unit 40-50 to be allocated a weight factor, as a result of which the overall confidence value 60 is obtained as the sum of the products of the individual confidence values and the respective weight factor divided by the number of activated functional units 40-50.

A mapping scheme 64 dependent on activation of individual functional units 40-50 (activation-dependent mapping scheme) may provide, for example, for a maximum logic operation on the confidence values of individual functional units 40-50 such that the resulting overall confidence value 60 is the highest confidence value of the activated functional units 40-50 (for confidence values that may assume only either the discrete value "0.0" or "1.0", this corresponds to a logic OR operation). If other functional units 40-50 are activated, an activation-dependent mapping scheme 64 may provide for a different form of logic operation on the individual confidence values, for example such that the overall confidence value 60 is obtained as the mean value of the individual confidence values of the activated functional units 40-50, or for example such that the overall confidence value 60 is obtained on the basis of at least one logic operation, for example at least one if-then operation, on the individual confidence values of the activated functional units 40-50. A wide variety of variants (possibly also in combination with one another) may be used. For example, if there are two or more activated functional units 40-50, one of the activated functional units 40-50 being expected to provide a particularly significant confidence value, then for example the linguistic analysis functional unit 40 may provide a higher weighting for its confidence value compared to the confidence value of other activated functional units 40-50. Selection and application of a formula or formation rule, for example a specific mapping scheme, for ascertaining the overall confidence value 60 with such a higher weighting of a confidence value is affected on the basis of an applicable logic operation. Alternatively, or additionally, an applicable logic operation may be used to detect when a confidence value of a first functional unit 40-50 in a specific range of values prohibits, or obviates the need for, a confidence value of another functional unit 40-50 being taken into consideration or requires a higher or lower weighting for this confidence value.

For the purpose of specifically activating and deactivating individual functional units 40-50 and possibly individual further functional units 52-58, a memory accessible to the analysis unit 32 holds at least one activation scheme 62 (FIG. 4) that the analysis unit 32 accesses in order to automatically activate and deactivate individual functional units 40-50, 52-58. The activation scheme 62 stipulates—for example in the form of or in the style of a binary mask— which functional units 40-50, 52-58 are active or are not active. A position of a datum in such a mask then determines the functional unit 40-50, 52-58 to which the activation or deactivation relates. For example, a mask such as "100001" means activation of the first functional unit 40 and the fifth functional unit 50, while the other functional units 42-48 are deactivated (the same applies to the other functional units 52-58). The analysis unit 32 reads such an activation scheme 62 and performs activation and deactivation of the individual functional units 40-50 in accordance with the activation scheme 62.

In the case of a predefined or predefinable sequential order of activated functional units 40-50, the activation scheme 62 also includes the order of activation of the individual functional units 40-50.

If in an embodiment the formation of the overall confidence value 60 is dependent on the type and number of activated functional units 40-50, 52-58, a memory accessible to the analysis unit 32 holds at least one mapping scheme 64 (FIG. 4) that the analysis unit 32 accesses in order to automatically form the overall confidence value 60.

Figure 4:
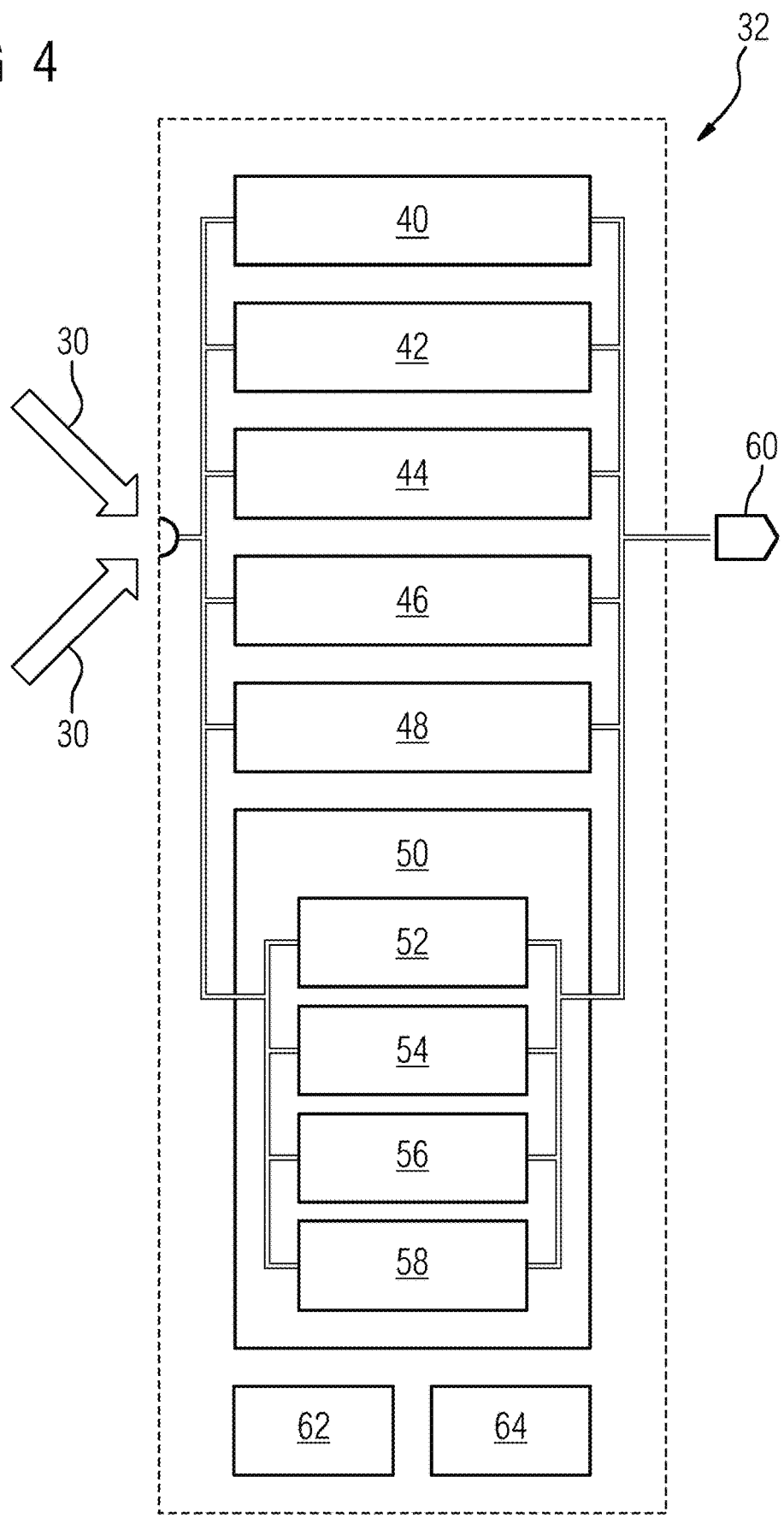
FIG. 4 depicts the analysis unit from FIG. 3 including functional units that the analysis unit includes and an optional activation scheme for specifically activating and deactivating individual functional units according to an embodiment.

The analysis unit 32 and the or each functional unit 40-50, 52-58 that it includes may be implemented in software, and accordingly the depiction of the analysis unit 32 in FIG. 4 is a schematically simplified depiction of a computer program that includes an implementation of the function of the analysis unit 32 (with the or each functional unit 40-50, 52-58 that it includes), for example an implementation of the function for evaluating at least one activation scheme 62 and/or at least one mapping scheme 64.

A computer system 18 (FIG. 1), for example including at least one processor and a memory, the memory of which has such a computer program loaded in it that is executed during operation of the computer system 18, is an example of an apparatus described here.

The result of the analysis of two data streams 30 and the data 12 that they include by the analysis unit 32 is an overall confidence value 60 that expresses the interrelation between the data streams 30, the data 12 they include and/or the respective data identifiers 20, 22. The result may be presented in the form of a table, for example in the form of a table as shown in the depiction in FIG. 5. An alternative presentation of the results is shown in the depiction in FIG. 6 in the form of a tree (diagram, ontology).

Figure 5:
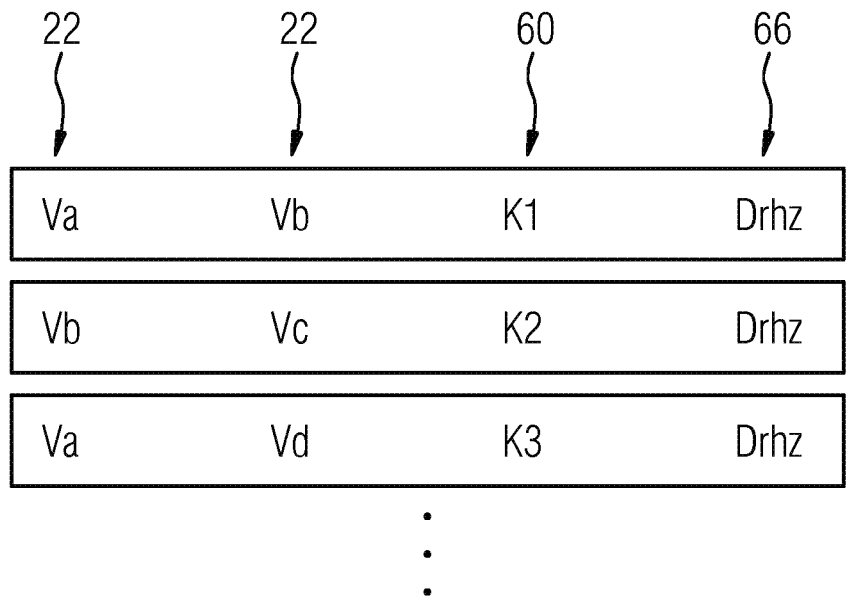
FIG. 5 depicts a tabular depiction of ascertained interrelations between incoming data and/or data identifiers according to an embodiment.
Figure 6:
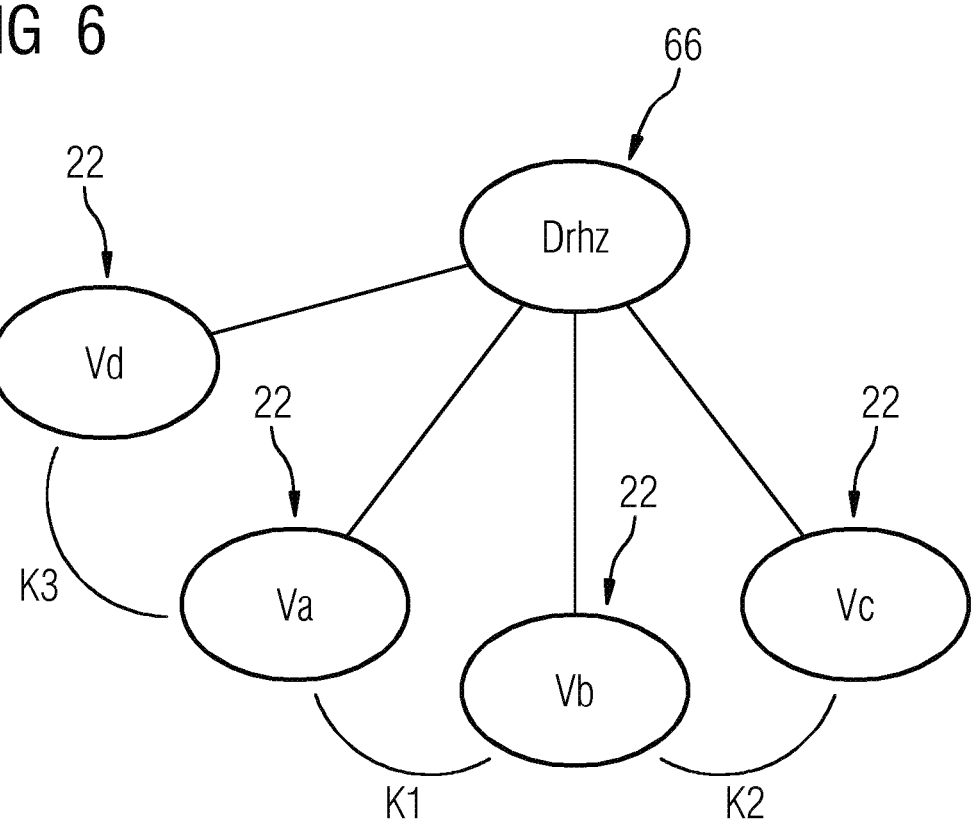
FIG. 6 depicts a depiction of ascertained interrelations as an alternative to the depiction in FIG. 5 according to an embodiment.

The table in FIG. 5 and the diagram in FIG. 6 contain the texts "Va", "Vb", "Vc" and "Vd" for arbitrary variables 22 (FIG. 2) and the texts "K1", "K2" and "K3" for overall confidence values 60 ascertained in each case with regard to data streams 30 containing data 12 of these variables 22. If the overall confidence value 60 is above a predefined or predefinable threshold value—for example "0.8"—the applicable variables 22 are interrelated in the manner outlined above. If the overall confidence value 60 is above a predefined or predefinable limit value—for example "0.5"— but below the threshold value, the variables 22 may be marked as interrelated in the manner outlined above manually. Interrelated variables 22 are denoted as interrelated by a higher-level variable name 66. The variable name is generated automatically by the analysis unit 32 on the basis of the type of data 12 or on the basis of a description of a variable 22, for example the first variable 22 considered for the analysis. The higher-level variable name 66 is shown symbolically as "Drhz" in the depictions in FIG. 5 and FIG. 6, the text being intended to stand for the German word "Drehzahl" and being obtained because the analyzed data 12 are speed-of-rotation data.

The mapping scheme 64 or alternatively also the activation scheme 62 may include a dynamic adaptation of the limit and/or threshold value. Such an adaptation is affected for example on the basis of predefined or predefinable limit and threshold values, for example a threshold value of "0.8" and a limit value of "0.5". It is then possible, for example in the case of an activation scheme 62 that provides for activation of a functional unit 40-50 whose confidence value is significant for the interrelation between two variables 22, for the threshold value to be lowered, for example by "0.1", by way of a dynamic adaptation, since an automatically detected interrelation may be assumed for a significant confidence value just when a confidence value is greater than or equal to "0.7", for example. Conversely, for a functional unit 40-50 whose confidence value is less significant, the threshold value may be raised by way of a dynamic adaptation, since a less significant confidence value is more likely to require a high confidence value in order for an interrelation to be able to be inferred automatically. This applies to an automatic dynamic adaptation of the limit value correspondingly.

The higher-level variable name 66 permits access to the variables 22 that are ascertained as being interrelated. The higher-level variable name 66 may be used for example to formulate a search in the data available in MindSphere 16, and the evaluation of an applicable search string results in the higher-level variable name 66 being automatically converted into the variables 22 that are combined thereunder and identified as being interrelated. A search string such as for example "FIND Drhz" is then accordingly automatically converted into a search string such as "FIND Va, Vb, Vc, Vd". It is thus possible for present and/or historic values of the ascertained variables 22 to be retrieved from the database of MindSphere 16, and the retrieved values may be used to produce a comparison of the speed-of-rotation data of different wind power installations (installations 10), for example. In general terms, this means that the ascertained higher-level variable name 66 may be used as a keyword in a database query, namely a query for the MindSphere database.

The preceding analysis by the analysis unit 32 may thus be taken as a basis for central access to interrelated data by an identifier (the higher-level variable name 66), regardless of how the data 12, the variables 22 or the assets and aspects 20 involved in the data transmission in MindSphere 16 were described originally.

In an embodiment, after an initial first ascertainment, overall confidence values 60, as are shown in the depiction in FIG. 5, are re-ascertained from time to time, for example at predefined or predefinable times or at predefined or predefinable intervals of time, on the basis of data 12 that have appeared in the meantime. A different overall confidence value 60 in comparison with a previously ascertained overall confidence value 60 may then be obtained, and this leads to resolution of a previously existing assignment to the higher-level variable name 66 or to a new assignment to the higher-level variable name 66, depending on the respective resulting new overall confidence value 60.

In an embodiment, a method for automatically processing data identifiers 20, 22 is provided. Data 12 associated with data identifiers 20, 22 are transmitted to a cloud platform 16, for example by different, but similar, technical installations 10. The cloud platform 16 includes an analysis unit 32 including at least one functional unit 40-50, and the or each functional unit 40-50 performs an analysis of the data 12 transmitted to the cloud platform 16 and/or of associated data identifiers 20, 22. As the result of the analysis, the functional unit 40-50, or each functional unit 40-50, outputs a confidence value. The or each confidence value is mapped to an overall confidence value 60 that codes an interrelation between two data identifiers 20, 22. Data identifiers 20, 22 ascertained as being interrelated are combined under a higher-level variable name 66. The higher-level variable name 66 is able to be used as a keyword for a database query that ultimately delivers data pertaining to all the data identifiers 20, 22 combined under the higher-level variable name 66.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for automatically processing a plurality of data identifiers, the method comprising:
transmitting data associated with a plurality of data identifiers to a cloud platform, the cloud platform comprising an analysis unit including at least one functional unit;
performing, by the at least one functional unit an analysis of the data transmitted to the cloud platform, of the plurality of data identifiers, or the data and the plurality of data identifiers, wherein performing the analysis comprises performing a spectral analysis of the data transmitted to the cloud platform and generating the confidence value on the basis of the result of the spectral analysis;
mapping the confidence value to an overall confidence value that codes an interrelation between sets of two data identifiers of the plurality of data identifiers, wherein a set of two data identifiers including an overall confidence value above a threshold value are determined to be interrelated;
combining interrelated data identifiers of the plurality of data identifiers under a higher-order variable name; and
performing a database query using the higher-order variable name, the database query configured to deliver data pertaining to all the interrelated data identifiers combined under the higher-order variable name.

2. The method of claim 1, wherein performing the analysis comprises performing, by the at least one functional unit of the analysis unit a linguistic analysis of the data identifiers, and generating a confidence value on the basis of the result of the linguistic analysis.

3. The method of claim 1, wherein performing the analysis comprises performing by the at least one functional units of the analysis unit a statistical analysis of the data transmitted to the cloud platform, and generating the confidence value on the basis of the result of the statistical analysis.

4. The method of claim 1, wherein performing the analysis comprises performing by the at least one functional unit of the analysis unit a correlation analysis of the data transmitted to the cloud platform and generating the confidence value on the basis of the result of the correlation analysis.

5. The method of claim 1, wherein performing the analysis comprises performing by the at least one functional unit of the analysis unit a cluster analysis of the data transmitted to the cloud platform and generating the confidence value on the basis of the result of the cluster analysis.

6. The method of claim 1, wherein performing the analysis comprises performing by the at least one functional unit of the analysis unit a context analysis of the data transmitted to the cloud platform, of the data identifiers, or of the data and the data identifiers and generating the confidence value on the basis of the result of the context analysis.

7. The method of claim 1, wherein the analysis unit comprises at least two functional units including at least two of a linguistic analysis functional unit, a statistical analysis functional unit a spectral analysis functional unit, a correlation analysis functional unit, a cluster analysis functional unit, a context analysis functional unit.

8. The method of claim 7, wherein at least at least two functional units is activable or deactivable.

9. The method of claim 8, wherein the activation or deactivation is effected in accordance with a predefined activation scheme.

10. The method of claim 9, wherein the predefined activation scheme also codes an order of activation, a time of activation, or the order of activation and time of activation for the functional unit that is to be activated.

11. The method of claim 8, wherein a confidence value of each activated functional unit is mapped to the overall confidence value in accordance with a predefined mapping scheme.

12. A non-transitory computer-readable data medium storing a computer program comprising program code, the computer program executed in a cloud platform, the program code configured to:
- receive data associated with a plurality of data identifiers at the cloud platform, the cloud platform comprising an analysis unit including at least one functional unit;
- perform an analysis of the data transmitted to the cloud platform, of associated data identifiers of the plurality of data identifiers, or the data and the associated data identifiers, wherein performing the analysis comprises performing a spectral analysis of the data transmitted to the cloud platform and generating the confidence value on the basis of the result of the spectral analysis;
- output a confidence value based on the analysis;
- map the confidence to an overall confidence value that codes an interrelation between two respective data identifiers of the plurality of data identifiers, wherein two data identifiers of the plurality of data identifiers including an overall confidence value above a threshold value are determined to be interrelated;
- combine interrelated data identifiers of the plurality of data identifiers under a higher-order variable name; and
- perform a database query using the higher-ordervariable name, the database query configured to deliver data pertaining to all the data identifiers of the plurality of data identifiers combined under the higher-ordervariable name.

13. A system for automatically processing a plurality of data identifiers, the system comprising:
- a cloud platform comprising program code instructions stored in a non-transitory computer readable medium configured to receive data associated with the plurality of data identifiers, the cloud platform comprising:
- an analysis unit comprising program code instructions stored in a non-transitory computer readable medium configured to implement one or more functional units configured to perform an analysis of the data, the plurality of data identifiers, or the data and the plurality of data identifiers, the one or more functional units configured to output a confidence value based on the analysis, wherein at least one of the one or more functional units comprises a spectral analysis functional unit comprising program code instructions stored in a non-transitory computer readable medium configured to perform a spectral analysis of the data identifiers of the plurality of data identifiers and generate the confidence value;
- the analysis unit comprising program code instructions stored in a non-transitory computer readable medium configured to map the confidence value to an overall confidence value wherein two data identifiers of the plurality of data identifiers including an overall confidence value above a threshold value are determined to be interrelated, the analysis unit configured to combine interrelated data identifiers of the plurality of data identifiers under a higher-ordervariable name;
- the analysis unit comprising program code instructions stored in a non-transitory computer readable medium configured to perform a database query where the higher-order variable name is used as a keyword for the database query configured to deliver data pertaining to all the data identifiers of the plurality of data identifiers combined under the higher-ordervariable name.

14. The system of claim 13, wherein at least one of the one or more functional units comprises a linguistic analysis functional unit comprising program code instructions stored in a non-transitory computer readable medium configured to perform a linguistic analysis of the data identifiers of the plurality of data identifiers and generate the confidence value.

15. The system of claim 13, wherein at least one of the one or more functional units comprises a statistical analysis functional unit comprising program code instructions stored in a non-transitory computer readable medium configured to perform a statistical analysis of the data identifiers of the plurality of data identifiers and generate the confidence value.

16. The system of claim 13, wherein at least one of the one or more functional units comprises a correlation analysis functional unit comprising program code instructions stored in a non-transitory computer readable medium configured to perform a correlation analysis of the data identifiers of the plurality of data identifiers and generate the confidence value.

17. The system of claim 13, wherein at least one of the one or more functional units comprises a context analysis functional unit comprising program code instructions stored in a non-transitory computer readable medium configured to perform a context analysis of the data identifiers of the plurality of data identifiers and generate the confidence value.

18. The system of claim 13, wherein the analysis unit comprises at least two functional units including at least two of from the group comprising the following functional units: a linguistic analysis functional unit, a statistical analysis functional unit, a spectral analysis functional unit, a correlation analysis functional unit, a cluster analysis functional unit, a context analysis functional unit.

* * * * *